United States Patent
Togawa et al.

[15] 3,684,880
[45] Aug. 15, 1972

[54] SYSTEM FOR TRANSFORMING COORDINATES

[72] Inventors: Hideo Togawa; Mitsuo Okamoto, both of c/o Nippon Denshi Kagaku Co., Ltd., 68, Hirakawa Kurumazuka, Joyo-cho, Kuze-gun, Kyoto, Japan

[22] Filed: Sept. 23, 1970

[21] Appl. No.: 74,552

[30] Foreign Application Priority Data

Sept. 29, 1969 Japan ............... 44/77617

[52] U.S. Cl. ............ 235/186, 235/150.53, 235/189, 235/192
[51] Int. Cl. ............................................ G06g 7/22
[58] Field of Search .... 235/150.51, 150.53, 186, 189, 235/191, 192, 197; 307/229, 261; 328/27, 28, 144, 158

[56] References Cited

UNITED STATES PATENTS

| | | |
|---|---|---|
| 3,180,977 | 4/1965 | Brakel .................... 235/189 |
| 3,457,394 | 7/1969 | Grado .................... 235/186 X |
| 3,482,086 | 12/1969 | Caswell .................. 235/186 |
| 3,512,151 | 5/1970 | Finkel et al. ........ 235/150.53 X |
| 3,320,411 | 5/1967 | Martinez ................ 235/186 X |
| 3,371,199 | 2/1968 | Schwartzenberg et al. ......................... 235/189 |
| 3,407,292 | 10/1968 | Cox ....................... 235/186 |

*Primary Examiner*—Eugene G. Botz
*Assistant Examiner*—Jerry Smith
*Attorney*—Christensen, Sanborn & Matthews

[57] ABSTRACT

Systems for transforming rectangular coordinates to polar coordinates, polar coordinates to rectangular coordinates, and rectangular coordinates to rectangular coordinates are disclosed. In each system, a sine wave is developed whose amplitude is proportional to $\sqrt{x^2 + y^2}$, or G, and whose phase relative to a fixed reference is proportional to $\tan^{-1} y/x$, or $\theta$. Operations upon these sine waves to obtain the desired transformations are accomplished by solid-state circuitry.

5 Claims, 7 Drawing Figures

HIDEO TOGAWA
MITSUO OKAMOTO

INVENTORS

BY Christensen,
Sanbara & Matthews
ATTORNEYS

HIDEO TOGAWA
MITSUO OKAMOTO
INVENTORS

BY Christensen,
Sanborn & Matthews
ATTORNEYS

SYSTEM FOR TRANSFORMING COORDINATES

This invention relates to a system for transforming coordinates, which comprises static elements.

For analysis of various physical phenomena, it is often required to transform one coordinate system to another, say, rectangular to polar or vice versa, or one rectangular system to another rectangular system by rotating the former about the origin thereof through a desired angle. Various electromechanical devices for transformation of coordinates have been proposed. In those prior art devices, however, there is a limit to the speed of transformation, the higher speed attainable being no less than one cycle per second. Several static types which comprise static elements have also been proposed. However, they require manual adjustment in the course of transforming operation, with a resulting increase in the time required for transformation. This offsets the merits resulting from the construction employing static elements.

Accordingly, it is one object of the invention to provide a static-type system for transforming coordinates, which has a higher speed of transformation than the prior art systems.

Another object of the invention is to provide a static-type system for transforming coordinates, which requires no manual adjustment.

Another object of the invention is to provide a static-type system for transforming rectangular coordinates to polar coordinates.

Another object of the invention is to provide a static-type system for transforming polar coordinates to rectangular coordinates.

A further object of the invention is to provide a static-type system for transforming a rectangular coordinate system to a different rectangular coordinate system by rotating the former about its origin through a predetermined angle.

Other objects, features and advantages of the invention will become apparent from the following description of some preferred embodiments thereof with reference to the accompanying drawings, wherein the same reference numerals in different figures denote corresponding parts, and wherein.

Figure 1:
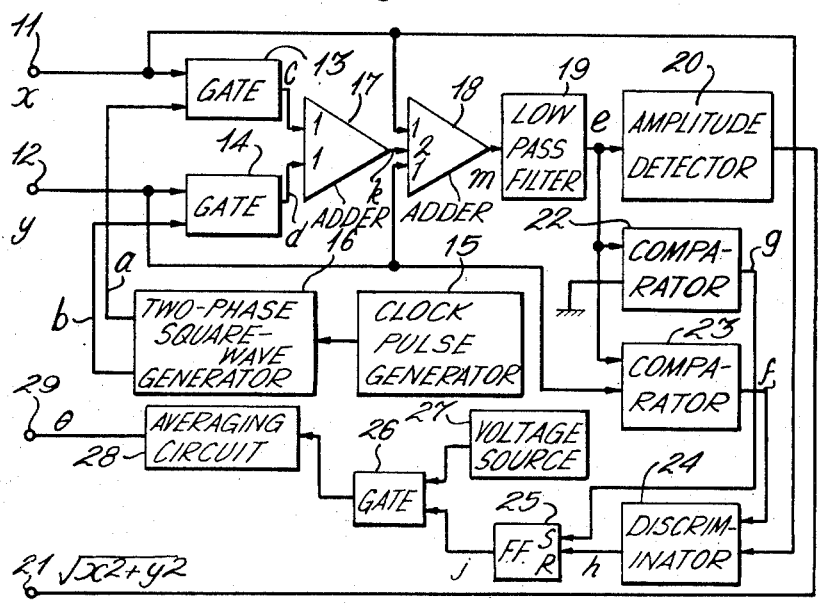
FIG. 1 is a block diagram of one embodiment of the invention arranged for transformation of rectangular to polar coordinates.
Figure 2:
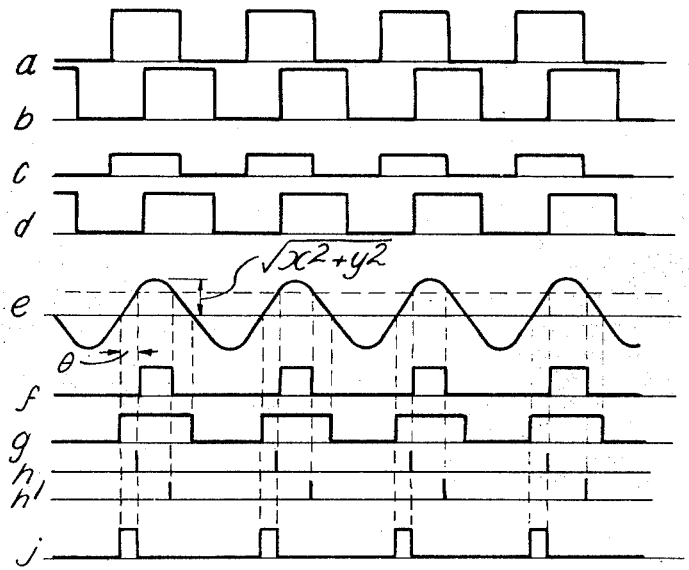
FIG. 2 is a waveform diagram for explanation of the operation of the system of FIG. 1.

Referring now to FIG. 1, there is shown an inverse resolver system for the rectangular-to-polar transformation of coordinates. The system includes a pair of input terminals 11 and 12. A voltage $x$ corresponding to the X-axis component of a point in a rectangular coordinate system is applied to the terminal 11 and a voltage $y$ corresponding to the Y-axis component of the point, to the terminal 12. The two inputs $x$ and $y$ are then applied to gate circuits 13 and 14, respectively. A clock pulse generator 15 produces clock pulses which actuate a two-phase square wave pulse generator 16 to produce outputs $a$ and $b$, which are applied as a gating signal to the gates 13 and 14, respectively. As shown in FIG. 2, the outputs $a$ and $b$ are square wave pulses 90° out of phase with respect to each other, so that the gates 13 and 14 produce outputs $c$ and $d$ as shown in FIG. 2, respectively. The outputs $c$ and $d$ are expressed by the following equations:

$$c = \frac{x}{2} + \frac{2x}{\pi} \sum_{n=1}^{\infty} \frac{1}{2n-1} \sin\{(2n-1)\omega t\}$$

$$d = \frac{y}{2} + \frac{2y}{\pi} \sum_{n=1}^{\infty} \frac{(-1)^n}{2n-1} \cos\{(2n-1)\omega t\}$$

where $\omega$ is the fundamental angular frequency of the circuit 16.

The outputs $c$ and $d$ are applied to an adder 17, which produces an output $k$ corresponding to the sum of the inputs $c$ and $d$, expressed as follows:

$$-k = \frac{-x-y}{2} + \frac{2}{\pi}\sqrt{x^2+y^2}\sum_{n=1}^{\infty} \frac{1}{2n-1} \sin\{(2n-1)\omega t + \theta(-1)^n\}$$

The output $k$ is applied as one input to an adder 18, to which the signals $x$ and $y$ are applied as the other inputs. The adder conducts the operation of $x + y + 2k$ to produce a corresponding output $m$ expressed as follows:

$$m = \frac{4}{\pi}\sqrt{x^2+y^2}\sum_{n=1}^{\infty} \frac{1}{2n-1} \sin\{(2n-1)\omega t + \theta(-1)^n\}$$

The output $m$ is applied to a low-pass filter 19, which passes the $\omega$ component of $n = 1$ and produces an output $e$ expressed as follows:

$$e = \sqrt{x^2+y^2} \sin(\omega t - \theta)$$

where $\theta = \tan^{-1} y/x$

It is seen from the above that when the inputs $x$ and $y$ are applied to the system, the sinusoidal output $e$ is obtained. The waveform of the output $e$ is shown in FIG. 2. It is clear that the output $e$ is a sinusoidal voltage having an amplitude corresponding to the radius vector $\sqrt{x^2+y^2}$ of the point in the rectangular system as transformed into a polar system and a phase corresponding to the deflection angle $\theta$ with respect to the fundamental angular frequency $\omega$.

The output $e$ is applied to an amplitude detector 20, which detects the amplitude $\sqrt{x^2+y^2}$ and produces a corresponding output voltage at a terminal 21. Thus, the radius vector $\sqrt{x^2+y^2}$ of the polar coordinates of the point defined by the X- and Y-axis components $x$ and $y$ in the rectangular system is expressed as the voltage appearing at the terminal 21.

The deflection angle $\theta$ can be obtained in the following manner. Let a circle having a radius of $\sqrt{x^2+y^2}$ be drawn about the origin of the rectangular coordinates. If a point on the circle has a deflection angle $\theta$ relative to the X-axis, the following equation is obtained:

$$y = \sqrt{x^2+y^2} \sin\theta$$

Therefore, if the value $y$ is obtained, the corresponding value of $\theta$ is the deflection angle to be obtained, and if the point moves at a constant speed along the circle, the time from when $\theta = 0$ to when the Y-axis component becomes $y$ is in proportion to the deflection angle $\theta$.

It will be clear from the above description that the period of time from when the output $e$ is zero to when it becomes $y$ is proportional to the deflection angle $\theta$. To measure the period of time, the output $e$ is applied as an input to two comparators 22 and 23. The voltage with which the comparator 22 compares the input $e$ is the ground potential, and the voltage with which the comparator 23 compares the input $e$ is the potential of the input signal $y$. During the period of time from when the output $e$ becomes zero to when it again becomes zero after a half-cycle, the comparator 22 produces an output $g$ as shown in FIG. 2, and during the time from when the output $e$ becomes equal to the input $y$ to when it again becomes equal to the input $y$ during the same half cycle, the comparator 23 produces an output pulse $f$ as shown in FIG. 2. The pulse $f$ is applied as one input to a discriminator 24 where it is compared with the input $x$. As shown in FIG. 2, when $x > 0$, the discriminator 24 produces an output $h$ at the leading edge of the pulse $f$ and when $x < 0$, the discriminator 24 produces an output $h'$ at the trailing edge of the pulse $f$.

A flip-flop 25 is set by the leading edge of the pulse $g$ and reset by the pulse $h$ or $h'$. When reset by the pulse $h$, the flip-flop 25 produces an output pulse $j$ as shown in FIG. 2, the width of which is proportional to the deflection angle $\theta$, as will be easily seen. The pulse $j$ is applied as a gating signal to a gate circuit 26, to which a source 27 applies a constant voltage. The output from the circuit 26 is smoothed by an averaging circuit 28 so as to appear at a terminal 29. The voltage at the terminal 29 is proportional to the deflection angle $\theta$. Thus, from the X- and Y-axis components $X$ and $Y$ of a point in the rectangular coordinate system it is possible to obtain the radius vector $\sqrt{x^2+y^2}$ and the deflection angle $\theta$ ($= \tan^{-1}(y/x)$) of the point in a polar coordinate system.

Figure 3:
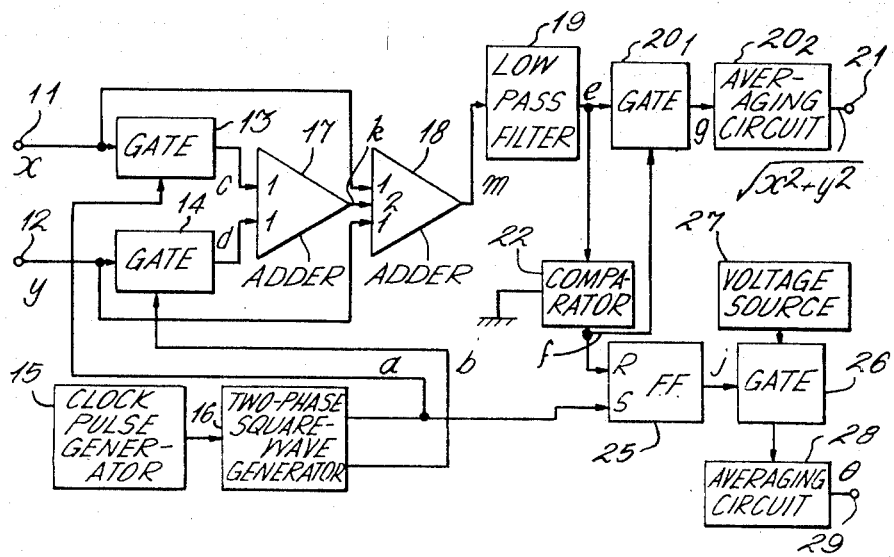
FIG. 3 is a block diagram of another embodiment of the invention arranged for transformation of rectangular to polar coordinates.
Figure 4:
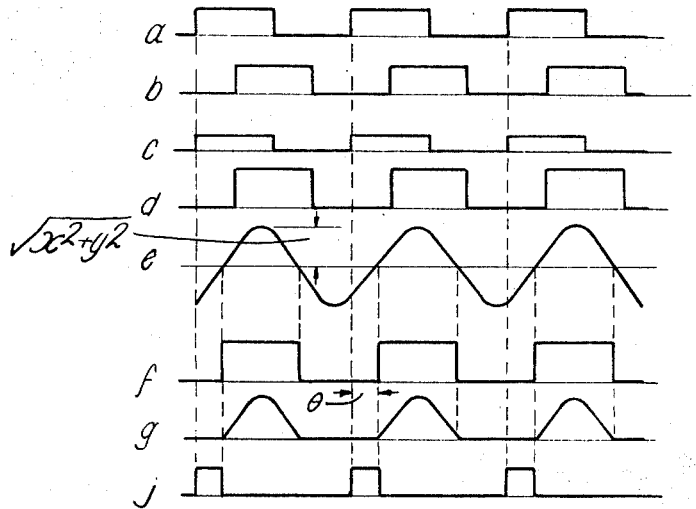
FIG. 4 is a waveform diagram for explanation of the operation of the system of FIG. 3.

In the arrangement of FIG. 1, the deflection angle $\theta$ is obtained from the time period measured from when the output $e$ is zero to when it has reached the level of $y$. The arrangement may also be such as shown in FIG. 3, wherein in order to obtain the radius vector $\sqrt{x^2+y^2}$ the output $e$ from the low-pass filter 19 is applied to a gate $20_1$, the output $g$ from which is applied to an averaging circuit $20^2$. The output from the filter 19 is also applied to a comparator 22 where it is compared with the ground potential. The output from the comparator 22 is applied as a gating signal to the gate $20_1$, which produces an output $j$ corresponding to the positive half of the output $e$ from the filter 19, as shown in FIG. 4. The output $g$ is smoothed by the averaging circuit $20_2$ and appears at a terminal 21. The output at the terminal is in proportion to the radius vector $\sqrt{x^2+y^2}$.

In FIG. 3 the deflection angle $\theta$ is calculated in the following manner: If the output $e$ is now zero, $\sin(\omega t -\theta) = 0$. Therefore, $\omega t - \theta = 0$ and $t = \theta/\omega$. As will be easily seen from this, the period of time from a reference time to when the output $e$ becomes zero is proportional to the deflection angle. To measure this period, the time when the output $a$ from the two-phase oscillator 16 rises is taken as the reference time, and the period of time from the reference time to when the output $e$ becomes zero is measured. To this end, the output $a$ from the oscillator 16 is applied as a set input to a flip-flop 35, to which the output $f$ from the comparator 22 is applied as a reset input. The flip-flop 35 produces an output $j$ as shown in FIG. 4, which is treated in the same manner as the pulse signal $j$ in FIG. 1, so that a voltage corresponding to the deflection angle $\theta$ appears at the output terminal 29.

Figure 5:
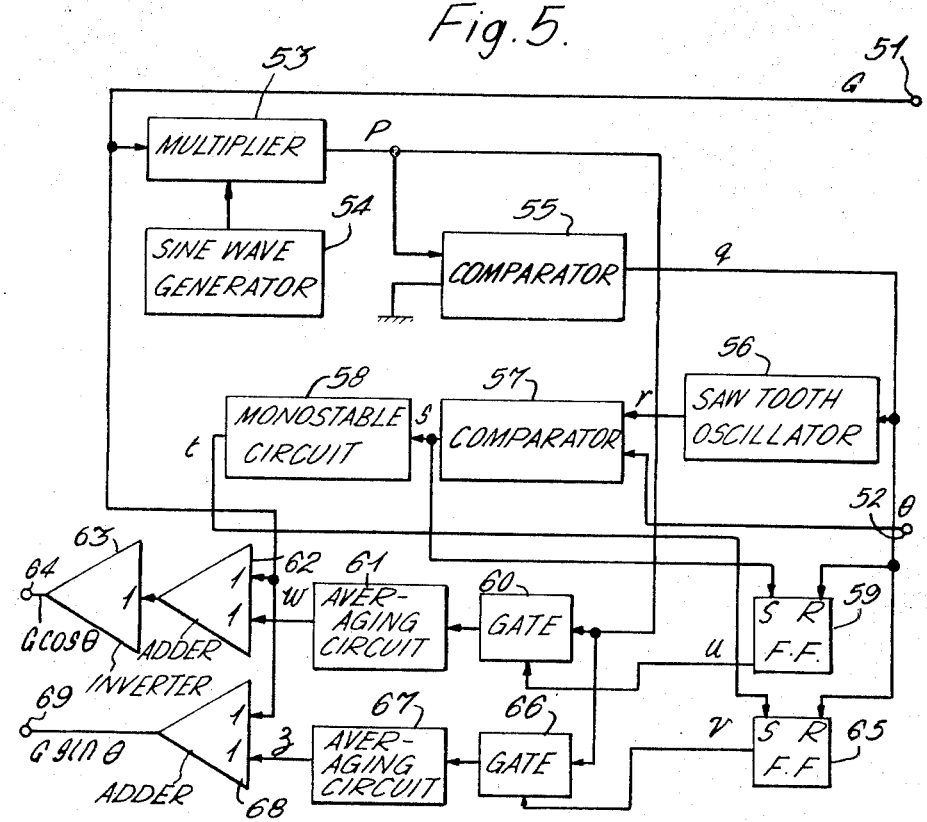
FIG. 5 is a block diagram of still another embodiment of the invention arranged for transformation of polar to rectangular coordinates.
Figure 6:
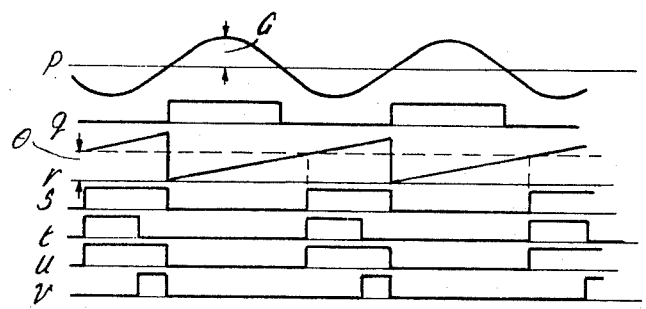
FIG. 6 is a waveform diagram for explanation of the operation of the system shown in FIG. 5.

With the above arrangements it is also possible to transform a rectangular coordinate system to a different rectangular coordinate system by rotating the former system through a desired angle about the origin thereof. For this rectangular-to-rectangular transformation, a system for transforming polar coordinates to rectangular coordinates is required in addition to the above-mentioned system for the rectangular-to-polar transformation. An example of the system for the polar-to-rectangular transformation of coordinates is shown in FIG. 5. Here, a voltage corresponding to the radius vector G of a point in a polar coordinate system is applied to an input terminal 51 and a voltage corresponding to the deflection angle $\theta$ of the point, to another input terminal 52. The latter voltage is the product of a voltage applied to the terminal 52 when the deflection angle is $2\pi$, multiplied by $\theta/2\pi$. If the X-axis and Y-axis components of a point in rectangular coordinates are $x$ and $y$, respectively, the radius vector G is given as $\sqrt{x^2+y^2}$ and the angle $\theta$, as $\tan^{-1}(y/x)$. The voltage G is applied as one input to a multiplier 53, to which a sine wave generator 54 applies a sine wave signal expressed as $\sin\omega t$ as the other input. The circuit 53 multiplies the two inputs and produces a sine wave output $p$ the amplitude of which is G, as shown in FIG. 6. This output signal is applied to a zero comparator 55 where it is compared with the ground potential. The output from the comparator 55 is pulse $q$ having a width equal to the half-wave of the output $p$ as shown in FIG. 6. The signal $q$ is applied to a saw tooth oscillator 56, so that the oscillator 56 is triggered by the leading edge of the pulse $q$ to produce a saw tooth output $r$. The arrangement is such that the peak of the saw tooth wave $r$ is equal to the level of the voltage $g$ applied to the terminal 52 when the deflection angle is $2\pi$. The saw tooth output $r$ is applied as one input to a comparator 57, to which the voltage corresponding to the deflection angle $\theta$ is applied as the other input, so that when the voltage $r$ exceeds the level of the voltage $\theta$, the comparator 57 produces an output $s$ as shown in FIG. 6. The time required for the output $r$ to increase from zero above the level of the voltage $\theta$ thereby causing the comparator 57 to produce the output $s$ is in proportion to the level of the voltage $\theta$. The output $s$ is applied to a monostable circuit 58, so that the circuit 58 is triggered by the leading edge of the pulse $s$ to produce an output $t$ as shown in FIG. 6. The circuit 58 is so designed that the output $t$ has a pulse width T/4 (that is, $\pi/2$) corresponding to one-fourth of one cycle T (that is, $2\pi$) of the sine wave output $p$.

The output pulse s from the comparator 57 is applied as a set input to a flip-flop 59 so that the flip-flop 59 is set by the leading edge of the pulse s to produce an output u as shown in FIG. 6. The output pulse q from the comparator 55 is applied as a reset input to the flip-flop 59 so that the flip-flop is reset by the leading edge of the pulse q. The pulse u has a width corresponding to the time period from when the deflection angle becomes θ to when it has become 2 π. The pulse u is applied as a gating signal to a gate circuit 60, to which the sine wave output p from the multiplier 53 is applied as an input. Therefore, while the pulse u is being applied to the gate 60, it permits the sine wave output p to pass therethrough so as to be applied to an averaging circuit 61. Since the gating signal is being applied only while the deflection angle increases from θ to 2 πthe output w from the averaging circuit 61 is given as follows:

$$w = \int_\theta^{2\pi} G \sin \theta d\theta$$
$$= G (\cos \theta - 1)$$

where sin ωt is replaced by sin θ.

The output w is applied as one input to an adder 62, to which the output G at the terminal 51 is applied as the other input, so that the adder 62 produces an output - G cos θ. This output is rendered positive by an inverter 63, so that a voltage corresponding to G cos θ appears at a terminal 64. This value is nothing but the X-axis component of a point in the polar coordinate system transformed into a rectangular coordinate system.

The output t from the mono-stable circuit 58 is applied as a set input to a flip-flop 65 so that the flip-flop is set by the trailing edge of the pulse t to produce an output v. The output q from the comparator 55 is applied as a reset input to the flip-flop 65 so that the flip-flop 65 is reset by the leading edge of the pulse q. Thus, the output v has a pulse width corresponding to the time period required for the deflection angle to change from θ + (π/2) to 2π, as shown in FIG. 6. The output v is applied as a gating signal to a gate circuit 66, to which the previously mentioned sinusoidal output p from the circuit 53 is applied as an input, so that the output p is allowed to pass through the gate 66 only while the deflection angle is between θ + (π/2) and 2π. The output from the gate 66 is smoothed by an averaging circuit 67, which produces an output z expressed as follows:

$$z = \int_{\theta + \frac{\pi}{2}}^{2\pi} G \sin \theta \, d\theta = G(-\sin \theta - 1)$$

The output z is applied to an adder 68 to which the signal G is also applied, so that the adder 68 adds the two values G and z and produces an output G sin θ at a terminal 69. This output is nothing but the Y-axis component of the point in the polar coordinate system transformed into the rectangular coordinate system.

Thus, when the radius vector G and the deflection angle θ of a point in a polar coordinate system are introduced into the system of FIG. 5, the X- and Y-axis components of the point in a rectangular system are obtained as the voltages appearing at the terminals 64 and 69, respectively.

If the arrangements of FIGS. 1 and 5 are combined, a system will result which is capable of transforming a rectangular coordinate system to a different rectangular coordinate system rotated an angle about the origin of the original system. To obtain a new rectangular coordinate system, the original system is first transformed into a polar system by means of the arrangement of FIG. 1. To the deflection angle θ resulted from the rectangular-to-polar transformation, there is added an angle α required for the original rectangular system to be rotated through in order to become a new rectangular system. With the angle θ + α as a new deflection angle, the polar coordinate system is transformed into a rectangular system by means of the arrangement of FIG. 5.

Figure 7:
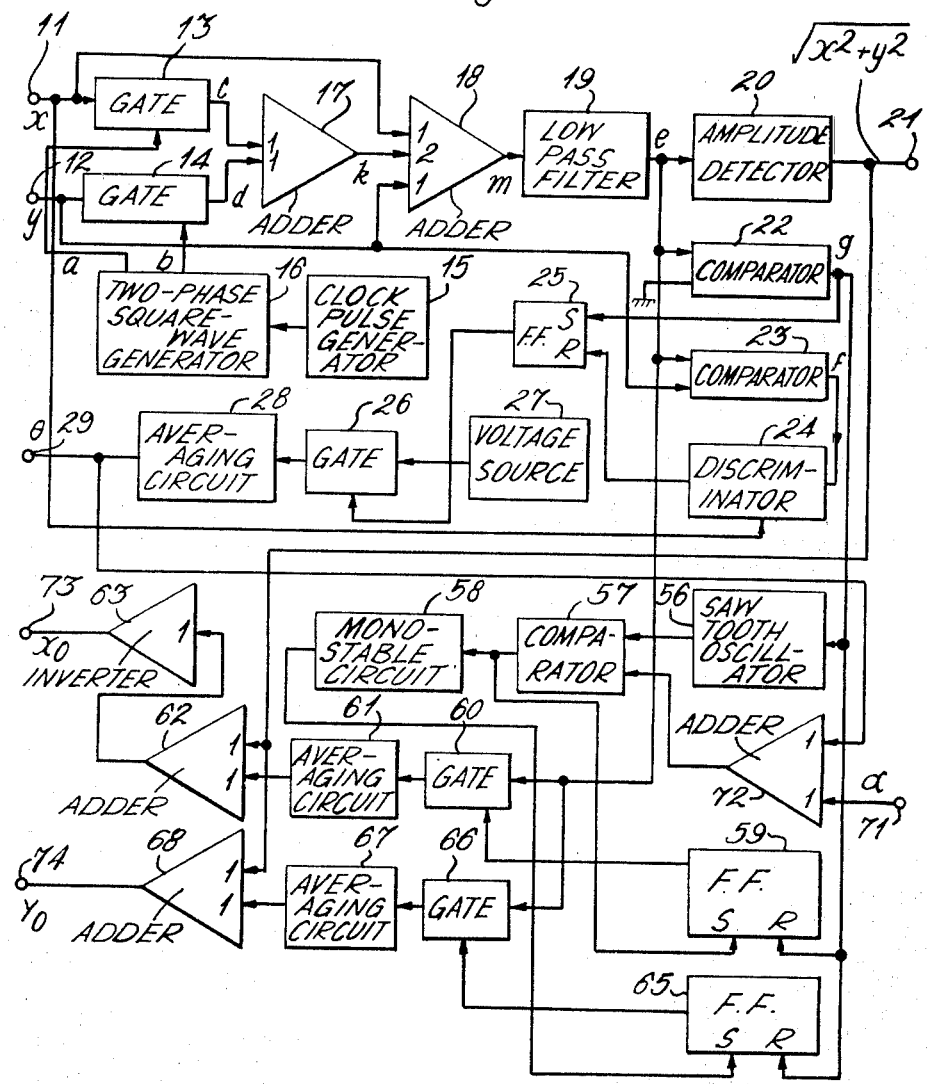
FIG. 7 is a block diagram of another embodiment of the invention arranged for transformation of a given rectangular coordinate system to a different rectangular coordinate system by rotating the former about its origin through a desired angle.

In FIG. 7, which is a combination of FIGS. 1 and 5 as mentioned just above, there is provided an input terminal 71, to which a voltage corresponding to the angle α is applied. The voltage is then applied to an adder 72, to which the output from the averaging circuit 28 corresponding to the deflection angle θ is also applied. The two inputs are added and the resulting sum is applied to the comparator 57, where it is compared with the output from the saw tooth oscillator 56. In FIG. 5 the sine wave output from the multiplier 53 is applied to the gates 60 and 66. However, since such a sine wave output is obtained from the low-pass filter 19 as previously mentioned with reference to FIG. 1, such a multiplier is omitted here in FIG. 7, and the sine wave output from the filter 19 is directly applied to the gates 60 and 66. The output from the amplitude detector 20, that is, $G = \sqrt{x^2 + y^2}$ is applied as one input to each of the adders 62 and 68. Thus, with the system of FIG. 7, by applying the inputs x and y corresponding to the X- and Y-axis components of a point in a rectangular coordinate system to the input terminals 11 and 22, and another input corresponding to the rotational angle α to the input terminal 71, it is possible to obtain at the terminals 73 and 74 the voltages corresponding to the X- and Y-axis components Xo and Yo of the point in a new rectangular coordinate system rotated α degrees from the original system.

In FIG. 7, that portion which corresponds to FIG. 1 may be replaced by the arrangement shown in FIG. 3.

What we claim is:

1. A system for transferring a polar to a rectangular coordinate system, comprising: a first input terminal to which a voltage G corresponding to the radius vector of a point in a polar coordinate system is applied; a second input terminal to which a voltage θ corresponding to the deflection angle of said point is applied; first circuit means for producing a sine wave output the amplitude of which is said voltage G; second circuit means for producing an output when said sine wave output passes a predetermined reference level; third circuit means receiving said voltage θ to detect a time corresponding to said deflection angle having been reached during the 2 π period of said sine wave output; fourth circuit means for passing said sine wave output only during the time from said detected time till said second circuit means produces an output; fifth circuit means for detecting a time delayed by π/2 from said time detected by said third circuit means; sixth circuit means for passing said sine wave output only during the time from said time detected by said fifth circuit means to when said second circuit means produces an output; seventh circuit means receiving the output from said fourth circuit means and said radius vector voltage G to produce a voltage corresponding to the X-axis component G cos $\theta$ of said point in said rectangular coordinate system; and eighth circuit means receiving the output from said sixth circuit means and said radius vector input G to produce an output voltage corresponding to the Y-axis component G sin $\theta$ of said point.

2. The system of claim 1, wherein said third circuit means comprises a saw tooth oscillator adapted to be triggered to produce a saw tooth output when the sine wave output from said first circuit means becomes zero, and a comparator comparing said saw tooth output and said deflection angle input voltage to produce an output when both said voltages becomes equal, and wherein said fifth circuit means comprises a mono-stable circuit receiving said output from said comparator and adapted to be rendered metastable to produce an output for a $\pi/2$ period during said $2\pi$ period of said sine wave output.

3. The system of claim 1, wherein said seventh circuit means includes an averaging circuit for integrating the product of multiplication of said radius vector input voltage and said sine wave output voltage for a period of time from $\theta$ to $2\pi$ of said deflection angle.

4. The system of claim 1, wherein said eighth circuit means includes an averaging circuit for integrating the product of multiplication of said radius vector input voltage and said sine wave output voltage for a period of time from $\theta + \pi/2$ to $2\pi$ of said deflection angle.

5. A system for transforming rectangular coordinates to polar coordinates, comprising: first circuit means receiving input voltages $x$ and $y$ corresponding to the X- and Y-axis components of a point in a rectangular coordinate system to produce a sine wave output whose frequency is proportional to an angular velocity $\omega$, whose amplitude is $\sqrt{x^2+y^2}$ and whose phase $\theta$ is tan$^{-1}(y/x)$, said first circuit means comprising a first and a second gate receiving said voltages $x$ and $y$, respectively, as an input, means generating two-phase square wave pulses, said square wave pulses having a fundamental angular frequency $\omega$ and being 90° out of phase with respect to each other, means supplying said two-phase square wave pulses to both said first and said second gates as a gating signal, a first adder receiving the voltages that pass said gates while said gating signal is applied thereto so as to produce an output $k$ corresponding to the sum of said voltages, a second adder for adding a voltage twice said output $k$ and said voltages $x$ and $y$, and a filter receiving the output from said second adder to pass the component of said fundamental angular frequency $\omega$; second circuit means receiving said sine wave output to produce an output corresponding to the amplitude thereof; third circuit means for producing a reference output signal when said sine wave output is at a reference voltage level; fourth circuit means for detecting said sine wave output having reached a voltage level corresponding to said phase $\theta$ to produce a detection signal; fifth circuit means for producing pulses whose width is equal to the time between the production of said reference signal and said detection signal; and sixth circuit means receiving said pulses produced by said fifth circuit means to produce an output voltage corresponding to said phase $\theta$.

* * * * *